(12) United States Patent
Heredia

(10) Patent No.: US 6,241,612 B1
(45) Date of Patent: Jun. 5, 2001

(54) VOICE COMMUNICATION DURING A MULTI-PLAYER GAME

(75) Inventor: Rafael Heredia, Easley, SC (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/188,122

(22) Filed: Nov. 9, 1998

(51) Int. Cl.[7] .............................. A63F 13/00; A63F 9/24; G06F 17/00; G06F 19/00
(52) U.S. Cl. ................................ 463/42; 463/40; 463/41; 704/200; 704/201; 704/270; 704/275; 725/18; 725/20; 725/118; 725/148; 725/127
(58) Field of Search .................................. 463/42, 40, 41, 463/35; 704/201, 200, 203, 270, 275; 725/18, 20, 118, 127, 148, 149

(56) References Cited

U.S. PATENT DOCUMENTS

| | | | |
|---|---|---|---|
| 4,569,026 | 2/1986 | Best | 364/521 |
| 5,026,051 | 6/1991 | Lowe et al. | 273/435 |
| 5,526,354 | 6/1996 | Barraclough et al. | 370/62 |
| 5,530,599 | 6/1996 | Kline | 370/62 |
| 5,530,699 | 6/1996 | Kline | 370/62 |
| 5,538,255 | 7/1996 | Barker | 463/41 |
| 5,556,107 | 9/1996 | Carter | 463/35 |
| 5,586,937 | 12/1996 | Menashe | 463/41 |
| 5,623,490 | 4/1997 | Richter et al. | 370/263 |
| 5,630,757 | 5/1997 | Gagin et al. | 463/43 |
| 5,685,775 | 11/1997 | Bakoglu et al. | 463/41 |
| 5,695,400 | 12/1997 | Fennell, Jr. et al. | 463/42 |
| 5,807,109 | * 9/1998 | Tzidon et al. | 434/35 X |
| 5,947,825 | * 9/1999 | Horstman et al. | 463/42 X |
| 5,956,485 | * 9/1999 | Perlman | 395/200.34 X |

OTHER PUBLICATIONS

Hunt, Trujillo, Orvis, "Structural and Electrical Characteristics of Silicon Field–Emission Microelectronic Devices," IEEE Transactions on Electron Devices, vol.38, No. 10, pp. 2309–2313, Oct. 1991.

* cited by examiner

Primary Examiner—Jessica J. Harrison
Assistant Examiner—Binh-An D. Nguyen
(74) Attorney, Agent, or Firm—Robert P. Bell; Peter Rutkowski

(57) ABSTRACT

Real-time synchronized voice communications during a multi-player game is disclosed. A server is connected to client computers, players. Players can speak into a microphone and have their voice transmitted to all players or a select few. Digitized voice communications are transmitted along with other game data. Player speech and game data is synchronized and reproduced in the same order it was captured.

2 Claims, 3 Drawing Sheets

VOICE COMMUNICATION DURING A MULTI-PLAYER GAME

FIELD OF THE INVENTION

The present invention relates to the field of computer games. In particular, the present invention relates to networked multi-player computer games which are played over a local area network or the Internet. Still more particularly to synchronized voice communication during a multi-player game.

BACKGROUND OF THE INVENTION

Computer games have long driven computer technology. The intense graphics and processing requirements of most computer games have stretched the limitations of processors, graphics controllers and the like. Moreover, computer games have fueled the market for so-called multimedia computers which include audio and video processing elements. A typical multimedia computer may be equipped with a microphone, stereo speakers, an advanced graphics controller with 2 or 3-D rendering capabilities, and real-time video imaging (e.g., MPEG-2 or the like). In addition, such computers may be provided with powerful audio processing capabilities including spatial imaging, surround sound, and the like. Typical home computers may be purchased with all such features at a fairly nominal cost.

Multi-player computer games have long been known in the art. Typical prior art SEGA and NINTENDO home entertainment systems may be provided with two or more control interfaces to allow multiple players to play a computer game against each other or in combination against the computer system within the game device. When players are in the same room, they may interact verbally with one another, as well as through the game interface. However both players utilize the same video device, sound device, and CPU.

Multi-player gaming through networks or over phone lines has long been known in the art. Before widespread acceptance of the Internet, multi-player games played over bulletin board systems (BBS's) were well known. Unlike SEGA and NINTENDO each player has their own video device, sound device, and CPU. However, when the players are not located in the same room, the verbal interaction between players is non-existent. Verbal interaction only exists when users are in the same physical location within ear shot of each other.

Some games provide a technique whereby messages can be transmitted between players by using a special command, then typing a message and sending it to all players. However, the time taken to type such a message would distract the player from game playing. As a result the player might lose the game while attempting to communicate with another player, due to the fact that these multi-player games are played in real-time.

Baker U.S. Pat. No. 5,538,255, issued Jul. 23, 1996 discloses a voice communication controller for transmitting a speech signal via microphone between two players of a computer game connected to each other via an analog phone line. However the image control commands and analog microphone signals are transmitted at alternate moments in time to share the same phone line. The speech is not synchronized with the game leaving a delay between the game play and the speech. The '255 patent does not allow for more than two players and moreover does not teach playing over a computer network or the like.

Carter, U.S. Pat. No. 5,556,107, issued Sep. 17, 1996 provides each player with audio intended for that player, independent of other players. Speech between players is not provided for, only audio originating from the computer game is transmitted to game controllers having headphones attached.

In more recent times, multi-player games have expanded with the widespread acceptance of the Internet. Various websites such as the MPLAYER server (www.mplayer.com) have been established as a clearinghouse for multi-player gaming. Players may log on to the website and play very sophisticated computer games over the Internet against players at remote locations. Games such as Quake, Warcraft, Starcraft, Duke Nukem, Motor Racer, Monster Truck Madness and the like have become extremely popular. Moreover, games based upon traditional sports such as hockey, baseball, and the like have also become popular in multi-player modes. The Internet has allowed people from all over the world to play with, or compete against, each other.

Thus, multi-player computer games, played over the Internet or other networks lack some of the real-time interaction experienced by players playing a multi-player computer game in the same room. In particular, Internet or other network players cannot talk to one another in real-time to encourage, disparage, strategize, scheme, or otherwise share their enjoyment of the computer game.

With the wide spread introduction of multimedia computers, new uses for the Internet and other networks are constantly being found. For example, Internet telephony techniques have been established using the audio capabilities of a typical multimedia computer. Using the microphone and speakers of a computer, a player can log on to the Internet and communicate with a remote Internet player verbally. Audio signals are received from the player's computer, digitized, and transmitted over the Internet where they are replayed at a receiver's speakers. Using such a technique, "telephone calls" can be placed over the Internet at very little or no expense. In addition, other forms of audio and video conferencing have been established over the Internet using multimedia computer capabilities. Using such techniques, a number of players may simultaneously interact through the Internet or other type of network sending audio signals to one another and/or video images.

SUMMARY OF THE INVENTION

The present invention relates to a technique for providing voice communication and other selective audio in a multi-player computer game played over a computer network. In the preferred embodiment, a microphone is provided at a player's computer which receives voice messages in real-time. These messages are either used to operate the player's computer game, or are transmitted along with player input signals (from joystick, keyboard, and the like) over a computer network (local area network, Internet, or the like) to a central server or servers. The server or servers transmit data to a number of other players on the network playing the same computer game. The data comprises player position information and other game data as well as voice packet data. The server program can customize the data sent to each individual player. Thus, the audio comments and reactions of one player are relayed over the network to other players.

Each player's computer decodes the voice packet data and plays back voice messages over an audio system in real-time. The voice packet data is transmitted in the same packet as other data such that the game data and voice data is synchronized. If a player shouts then shoots, all networked players will hear the shout before the shot.

Each player can either receive selective data or select which data to replay as it is received by the computer.

Therefore, a player is able to speak to a select number of players as opposed to all players. As an example, when playing on teams, team members may only hear other team members until they are in ear shot of opposing players.

Spatial imaging and echo cancellation techniques may be implemented, preferably at the player's computer, to provide a number of special effects and features. Echo cancellation may be used to prevent feedback of the player's voice from the player's computer speakers through the microphone. Spatial imaging may be used in combination with player position data to provide a realistic positioning of an opponent's voice within the game's soundtrack. Thus, as a player approaches or recedes from another player in the computer game, the voice may be amplified or attenuated proportionally. Moreover, spatial imaging techniques may provide a sense of depth to locate the player's voice based upon the player's location within the computer game. Doppler shift effects may also be provided, for example in an auto race game or the like, to provide a realistic vocal effect when one player passes by another at a high rate of speed.

In an additional embodiment, voice commands may be used as an input to the computer game. A player's microphone may receive voice commands for player input (e.g., move, fire, and the like) in place of or in addition to joystick or keyboard command inputs.

In another additional embodiment, each of the networked players software is capable of acting as the server does in the preferred embodiment described above. One player would choose the games parameters such as number of players, types of weapons, and other game specific parameters. Once the parameters are set up and transmitted to all players software, all player data can flow through one players game program, or else each players program will individually transmit data to all players. Therefore a server independent from the players game programs is not required.

DETAILED DESCRIPTION OF THE INVENTION

The present invention allows for audio signals to be transmitted to and from a server computer by a game playing client through the Internet or other type of network such as a local area network. These audio signals may be transmitted to other client computers where they may be combined or modified to produce a real-time audio commentary accompanying the game. The present invention takes advantage of the increased capabilities of modern multimedia computers to achieve this effect. Full duplex capabilities allow players to speak to other players and hear other player comments simultaneously.

Figure 1:
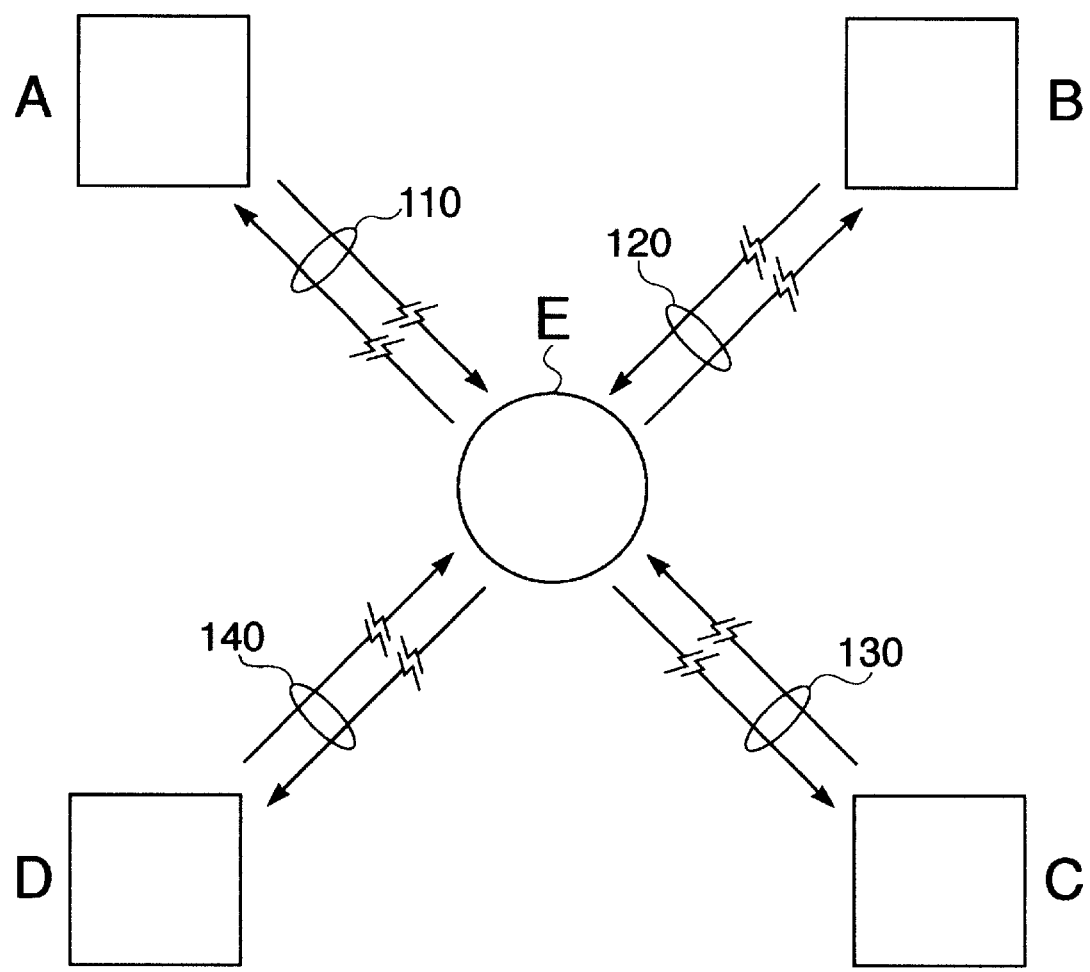
FIG. 1 is a block diagram illustrating interaction between a plurality of client computers in a central server computer in multi-player gaming.

FIG. 1 is a block diagram illustrating a number of client computers coupled via network to a server computer. Four client computers A, B, C, and D are shown by way of example only, as may be readily appreciated by one of ordinary skill in the art. Any number of client computers may be coupled directly or indirectly to server E via network connections 110, 120, 130, and 140.

Game software may be loaded onto each clients computer: A, B, C, and D. Such gaming software may be purchased independently, retrieved as a java applet or similar browser embedded code, or downloaded through network links 110, 120, 130, and 140. Note that for purposes of illustration, the actual structure of the network in FIG. 1 is illustrated schematically only. Actual connectivity between clients A, B, C, and D and server E may occur through a number of separate links or servers, and the like as illustrated by the broken lines in connections 110, 120, 130, and 140. Moreover, multiple servers E may be used, coupled together appropriately to serve a number of additional clients.

Since each of client computers A, B, C, and D are provided with a copy of the game software, complex image data, texture maps, sounds, and the like are already loaded onto client computers A, B, C, and D. Thus, network links 110, 120, 130, and 140 are not required to download such data on a continuous basis. Rather, server E only needs to transmit data to clients A, B, C, and D to synchronize game play and voice communications among the client computers.

Thus, for example, in a role-playing game, where players interact or fight with one another over a topographical landscape, interconnected rooms, or the like, server E continuously provides data to each of client computers A, B, C, and D indicating the relative spatial coordinates of each player within the game domain, along with status data for each player. In addition, other data may be transmitted indicating whether a player has fired or used a weapon or, if the game is played against server computer E, whether server computer E, through its virtual minions, has attacked or fought players of client computers A, B, C, and D.

As noted in the background of the invention, other data may also be transmitted. For example, each of client computers A, B, C, and D may transmit messages in text format between one another. However, as noted above, transmission of such text messages during playing of a live action game can be cumbersome and impair the player's ability to play the game.

Figure 3:
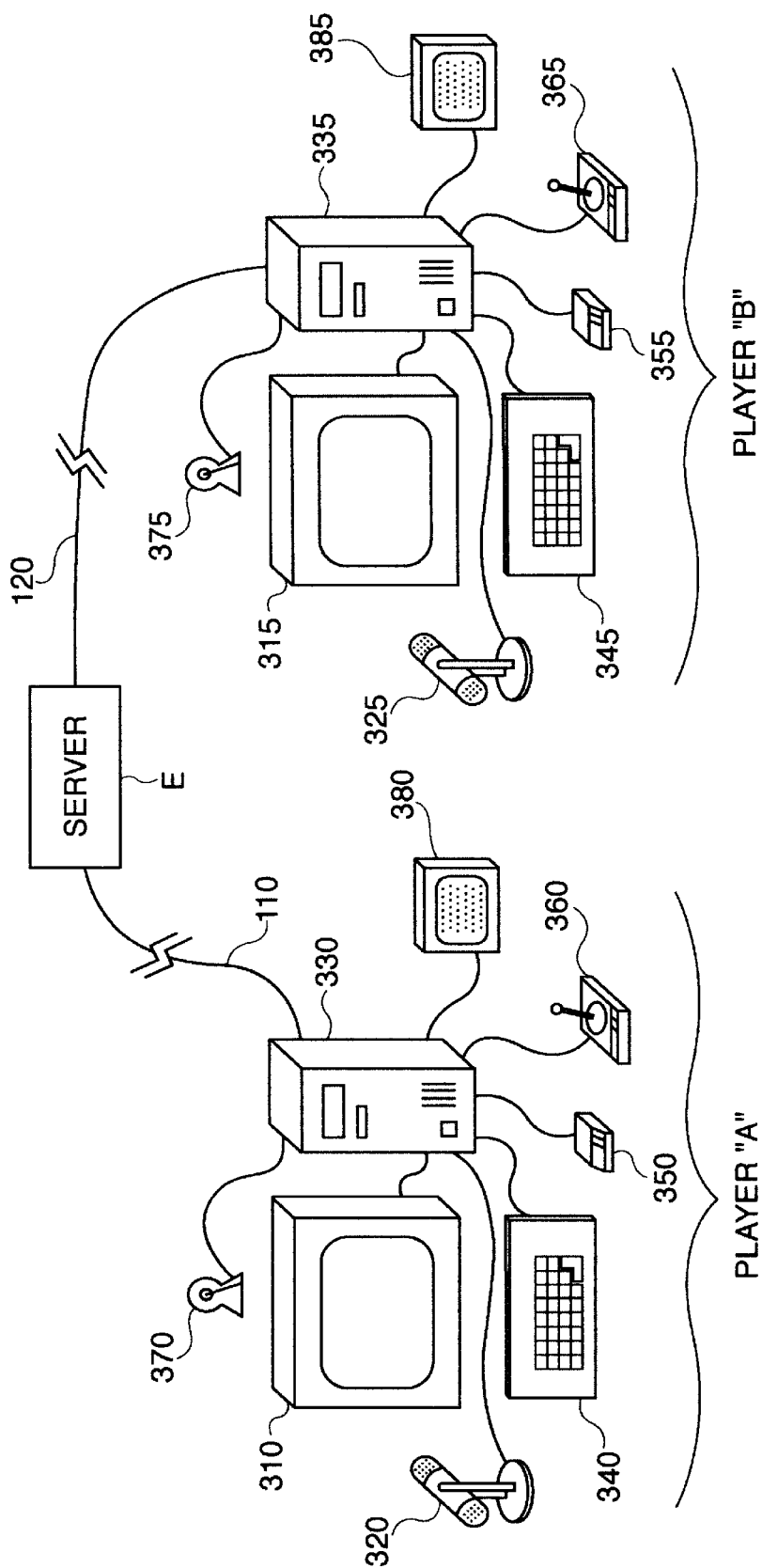
FIG. 3 is a block diagram illustrating, in more detail, some of the components of FIG. 1.

FIG. 3 is a block diagram illustrating, in more detail, some of the components of FIG. 1. For purposes of illustration, only client computers A and B are illustrated. However, client computers C and D may be provided with the same or similar components.

In the present invention, each of client computers A, B, C, and D may be so-called multi-media computers provided with CPUs 330,335. Client computers A and B may be provided with microphones 320,325 as well as a speakers 380,385. Note that for the purposes of illustration, speakers 380,385 are shown as single speakers. However, speakers 380,385 may comprise two or more speakers in a stereo, surroundsound, or other type of spatial imaging output. In addition, client computers A and B may be provided with audio outputs to interface to home entertainment system electronics or the like.

Client computers A and B may also be provided with other multimedia input devices such as cameras 370,375 and joysticks 360,365. In addition, more traditional input devices such as keyboards 340,345 and mice 350,355 may also be provided. Images for the computer games may be displayed on monitors 310,315.

Each player A,B may communicate verbally into microphones 320,325 and such data may be digitized in CPUs 330,335 and transmitted through network links 110,120 to server computer E. Server computer E may mix and retransmit such audio data as part of the game data to each of client computers A, B, C, and D. Server computer E may also act as a communications port, transmitting data to each client computer allowing the client computers game program to decipher which data to use and which data to discard.

Figure 2:
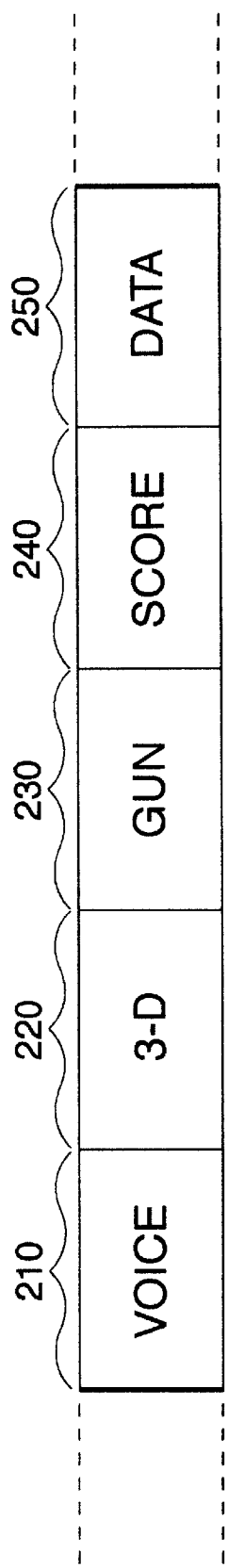
FIG. 2 is a diagram illustrating the time division multiplexing of audio signals and game command signals.

FIG. 2 is a diagram illustrating the time division multiplexing of game data. Since game data comprises little more than player position and other numerical indicia, the bandwidth required for real-time game playing over a network is very small. Thus, there is a large amount of available bandwidth for transmitting additional data such as voice or other audio data. Moreover, as demonstrated by Internet telephony and teleconferencing techniques, audio data may be transmitted in real-time or near real-time over the Internet or other types of networks within the bandwidth limitations of such networks.

FIG. 2 illustrates the data stream transmitted either to or from a client computer A, B, C, or D to server computer E. Data may be divided into a number of different blocks (packets) which may be transmitted in sequence. At the end of the sequence, the sequence is repeated over again for as long as the game is played or the player is connected to the gaming server.

The first element in the sequence of FIG. 2 comprises voice data 210. Note that this element is shown as occurring first within the frame of data for purposes of illustration only. In practice, each of the data elements may be placed in any particular order.

Voice data 210, when transmitted from client A, B, C, or D to server E, may comprise the voice or audio data received from the player's microphone. Server E may mix that voice data with other voice and audio data received from the remaining clients A, B, C, or D. Thus, in the in voice segment 210 of FIG. 2 as transmitted from server E to clients A, B, C, and D, they comprise a mixed data signal for each of players A, B, C, and D. This voice segment 210 may be mixed in a number of ways.

For example, the audio signals could just be mixed using predetermined levels to produce a single audio output. In another embodiment, voice segment 210 may be further time division multiplexed to provide separate audio data channels for each of players A, B, C, and D. The use of separate audio channels may be useful in spatial imaging of voice and audio data, as will be explained below.

The remaining fields 220, 230, 240, 250 comprise prior art data fields. Fields 220, 230, 240, and 250 are shown by way of illustration only. These data fields may comprise any number of prior art data fields known for transmitting game information. For example, field 220 may comprise three dimensional location information. Field 220 may include location information for a player, if the data is being transmitted from a client A, B, C, or D to server E.

If the data stream is from server E to client A, B, C, and D, field 220 may comprise three dimensional location information for each player represented by clients A, B, C, and D. Field 230 may represent function field, illustrated here as "gun." This data field may indicate weapon status, whether fired, where fired, and the like. This field may also include other action data or data for other types of weapons. Again, if the data is being transmitted from client to server, the data may comprise only the updated client action information. From the server to the client, data field 230 may include data representing action information for all clients.

In a similar manner, field 240 may include score data and the like. Field 250 may include other data, including text message data and other information transmitted in the prior art. In addition, field 250 may also include timing data. Such timing data may be needed to synchronize each of client computers A, B, C, and D such that the game is played back in real-time on each computer in a synchronized fashion. Such timing signals may also be needed to ensure that voice signals 210 are played back in the appropriate order such that a voice and an action occur in proper sequence. Thus, for example, if a player shouts at another player and then shoots them, it should play back on the opponent's computer in the correct order, rather than being shot first and then hearing the shout.

In the preferred embodiment in the present invention, most processing of audio occurs within client computers A, B, C, and D. While it is possible to provide audio processing within server E, client computers A, B, C, and D, if provided with multimedia hardware and/or software, may already possess the resources necessary to process audio data.

Thus, echo cancellation features normally found in multimedia computers may be utilized to prevent feedback of a player's voice from a client computer speakers to client computer microphone. For example, a player will not hear their voice reproduced in their speakers, the player will only hear other players voices emanating from their speakers.

Similarly, spatial imaging or surround sound processing may be provided in client computers A, B, C, and D to provide realistic audio processing. Thus, for example, in a role playing computer game, if a player enters a virtual "room" and shouts, the computer may generate an appropriate echo based upon the dimensions of the virtual "room." Moreover, if other players are present in the virtual "room", their voice will appear, through the use of spatial imaging, to come from a location in that room.

Thus, the present invention provides a much more realistic game playing experience. In a role playing game, even if the player cannot see an opposing player, he may be able to locate or have a general idea where the player is located based upon the player's voice. If a player is located at a far distance, their voice may be heard, although attenuated corresponding to the distance the opposing player is from the player. For example, player A will hear player B's voice louder than player C's voice if player B is one foot away and player C is 10 feet away.

Similarly, other types of audio effects may be produced. For example, if an opposing player is in an adjoining room, their voice may be heard, although muffled using audio effects. Similarly, when playing on teams, team members may only hear other team members until they are in ear shot of opposing players. Voice communications may only be replayed by the game program of the intended player.

In addition, in high-speed games, such as auto racing games and the like, Doppler shift effects may be applied to an opposing player's voice such that if an opposing player were to speed by a player, there voice would appear to shift in frequency according to well known Doppler effects.

Applying such spatial imaging and other audio processing techniques may be performed using a number of known techniques. In a simplest form, voice packet 210 of FIG. 2 may be time division multiplexed into a number of separate "channels" each representing the voice or audio signals produced by a different client A, B, C, and D. Using the 3-D location data field 220 for each of client A, B, C, and D, a client computer A, B, C, or D can determine the relative location of each player and process the corresponding audio track accordingly.

Thus, for example, if one of the opponent players is nowhere near the player, the audio track for that opponent player may be completely deleted or severely attenuated or muffled. A player will only hear audio data from those players in the immediate vicinity. Also, if player B speaks to player A and player A's coordinates are such that player B is standing behind player A, player B's voice would be reproduced from the rear speakers behind player A, when using a surround sound speaker system.

A software function within the computer game may be provided to allow a player to call out to a player who is not normally within ear shot as determined by the bounds of the virtual environment.

Using a multichannel embodiment for player audio data allows each client computer A, B, C, and D to process audio data in a separate fashion. However, other embodiments may be used. A mixed signal or multichannel signal may be transmitted in field 210 which may be separately spatially processed by each of client computers A, B, C, and D. Such an embodiment may reduce the amount of data necessary to be transferred and may be more readily implemented in games where the virtual environment is limited in scope.

In addition, audio data can simply be mixed and replayed such that each player will hear the comments of the other players in a similar manner as in prior art television computer games where players sitting in the same room may exchange comments with one another. In such an embodiment, spatial processing may not be necessary, as the purpose is only to allow players to exchange their comments during the game playing.

In an alternative embodiment, server E may receive audio data from each of clients A, B, C, and D and generate a specific audio track for each of clients A, B, C, and D. Such an embodiment places additional processing burdens on server E. However, with a high power server such burdens are not unreasonable. In such a situation, the data stream of FIG. 2 may be customized for each of clients A, B, C, and D. In other words, each of clients A, B, C, and D do not receive the same data stream but rather a unique data stream containing data only for the respective client.

Server E may thus generate an audio data field 210 which includes properly spatially imaged audio corresponding to the locations of each player represented by clients A, B, C, and D. In addition, server E can also perform echo cancellation functions merely by deleting input from the appropriate client to prevent feedback.

In yet another additional embodiment, each of the networked players software is capable of acting as the server does in the preferred embodiment described above. Players connect to one another using their IP addresses. If a server is used, it only distributes IP addresses to each players program to start the game then performs no additional functions. One player then chooses the games parameters such as number of players, types of weapons, and other game specific parameters. Once the parameters are set up and transmitted to all players, all player data can flow through one players game program or each players program will individually transmit data to all players. Therefore a server independent from the players game programs is not required.

As noted above, typing messages into a computer during a computer game can be very distracting, often resulting in the player loosing control of the game. Many computer games use keyboard commands to activate certain features, particularly in sophisticated games where player has a number of different weapons or options available. A player can become completely distracted trying to type in a keyboard command or remember which key on the keyboard corresponds to a particular weapon or control command. As a result, the realism of the game is somewhat attenuated.

As a corollary to the present invention, the audio features of client computers A, B, C, and D may be utilized to allow verbal input of commands. Audio recognition software such as the DRAGON™ voice recognition software is well known in the art. Using such software modules, a player can use a verbal command to engage a particular weapon or feature of the computer game. Such commands may be proceeded with a particular code word such as "command" to distinguish them from verbal signals sent to other players. In the alternative, the player may press a button on a joystick or key on the keyboard to indicate a verbal command is being entered.

Such a feature prevents such commands from being transmitted as audio signals to other players and tipping them off of the player's intent. Such commands also allow players to selectively choose to speak to only one other player or a select group of players. Moreover, the use of a command keyword or button prevents opponent players from attempting to confuse a player's computer by issuing such commands through the audio link of the present invention.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

For example, in the preferred embodiment, voice data and game data are time division multiplexed in the same data stream. However, it is entirely within the spirit and scope of the present invention to provide voice data and game data as separate data streams. For example, in Digital Subscriber Line (DSL) applications, enhanced bandwidth amy be available for sending data and voice (or even image) as two separate data streams, or as a number of separate data streams using an ADSL (Asymmetrical Digital Subscriber Line) modem or the like. Such systems take advantage of the broad bandwidth available in a conventional telephone connections beyond the traditional bandwidth of POTS (plain old telephone service) signals.

Thus, for example, a LAN may be provided using the enhanced bandwidth of a DSL, using an ethernet protocol or the like. Thus, data signals (voice or game data) may be sent locally, even within the same house or building, using conventional telephone lines as a data path, while still leaving the POTS signals undisturbed. Similarly, data signals (voice or game data) may be transmitted over conventional power lines by filtering out the 60 Hz power signal. Thus, for example, two computer gaming systems may be coupled together in a low-cost network by using existing wiring within the home or office.

What is claimed is:

1. A video game system for providing real-time synchronized audio during a multi-player game, comprising:
   a plurality of game player client computers, each including a player voice input means for inputting a player voice and producing a player voice signal for that game player client computer;
   a server computer; and
   a network connecting said plurality of game player client computers with said server computer, for transmitting data between plurality of game player client computers and the server computer, wherein each of said plurality of game player client computers further comprises a first data processing and transfer program, residing in each of the plurality of game player client computers, for processing video game data, converting the player voice signal into player voice data, combining video game data with player voice data into data packets and transmitting the data packets over said network to said server computer, wherein said server computer further comprises a second data processing and transfer program, residing within said server computer, for receiving the data packets from each of the plurality of game player client computers, combining the data packets from each of the plurality of game player client computers into a combined data packet including combined player voice data and combined video game data, and routing the combined data packet to each of the plurality of game player client computers, wherein each of said plurality of game player client computers further comprises at least one speaker, coupled to the game player client computer for generating sounds, wherein each of said first data processing and transfer program receives the combined data packet from the network, converts the combined player voice data into a player voice signal, and plays back the player voice signal over the at least one speaker, wherein each of said first data processing and transfer program for each same player client computer removes player voice data for that game player client computer from the combined player voice data so as to prevent feedback of the player voice signal over said at least one speaker wherein the combined player voice data comprises each of the player voice data for each of the player computers time division multiplexed together.

2. The video game system of claim 1, wherein said at least one speaker comprises at least two speakers for providing a stereo sound output; and wherein said first data processing and transfer program spatially processes the combined player voice data based upon the combined video game data so as to position aurally, individual player voice signals based upon player location in a video game.

* * * * *